US012623884B2

(12) United States Patent
King

(10) Patent No.: US 12,623,884 B2
(45) Date of Patent: May 12, 2026

(54) SYSTEMS AND METHODS FOR TOUCHLESS ELEVATOR CAB REQUESTS

(71) Applicant: TK Elevator Innovation and Operations GmbH, Duesseldorf (DE)

(72) Inventor: Chih-Hung A. King, Sharpsburg, GA (US)

(73) Assignee: TK Elevator Innovation and Operations GmbH, Duesseldorf (DE)

(*) Notice: Subject to any disclaimer, the term of this patent is extended or adjusted under 35 U.S.C. 154(b) by 1005 days.

(21) Appl. No.: 17/750,033

(22) Filed: May 20, 2022

(65) Prior Publication Data

US 2023/0373747 A1 Nov. 23, 2023

(51) Int. Cl.

*B66B 1/34* (2006.01)
*B66B 1/46* (2006.01)
*B66B 3/00* (2006.01)

(52) U.S. Cl.

CPC ............ *B66B 1/3461* (2013.01); *B66B 1/468* (2013.01); *B66B 3/006* (2013.01); *B66B 2201/103* (2013.01); *B66B 2201/4615* (2013.01); *B66B 2201/4638* (2013.01); *B66B 2201/4676* (2013.01)

(58) Field of Classification Search

CPC ....... B66B 1/3461; B66B 1/468; B66B 3/006; B66B 2201/4615; B66B 2201/4638; B66B 2201/4676

USPC .......................................................... 187/247

See application file for complete search history.

(56) References Cited

U.S. PATENT DOCUMENTS

| | | | | |
|---|---|---|---|---|
| 5,736,692 | A * | 4/1998 | Lumme | B66B 1/468 187/247 |
| 9,045,314 | B2 * | 6/2015 | Finschi | B66B 1/468 |
| 9,624,071 | B2 * | 4/2017 | Hanvey | B66B 1/34 |
| 2012/0138389 | A1 * | 6/2012 | Furutani | B66B 1/468 187/247 |
| 2012/0211309 | A1 | 8/2012 | Tokura | |
| 2014/0231185 | A1 * | 8/2014 | Salmikuukka | B66B 1/2458 187/384 |

(Continued)

FOREIGN PATENT DOCUMENTS

| | | | |
|---|---|---|---|
| CN | 207658879 | U | 7/2018 |
| CN | 110662710 | A | 1/2020 |

(Continued)

*Primary Examiner* — Christina M Schreiber

(74) *Attorney, Agent, or Firm* — Dinsmore & Shohl LLP

(57) ABSTRACT

Embodiments of the present disclosure are directed to a system for a touchless request for an elevator cab. The system for a touchless request for an elevator cab includes an elevator controller, a processor communicatively coupled to the elevator controller, and a storage medium in communication with the processor comprising programming instructions cause the processor to: receive a unique identification from a user, determine a current floor that the unique identification was provided, access a data storage device to determine a destination floor access permission based on the unique identification, determine a landing to travel based on the destination floor access permission, send an elevator cab request command to the elevator controller to request the elevator cab to the current floor and to travel to the landing, and generate a notification for the elevator cab that is assigned to travel between the current floor and the landing.

19 Claims, 7 Drawing Sheets

(56) References Cited

U.S. PATENT DOCUMENTS

| | | | | |
|---|---|---|---|---|
| 2015/0368067 | A1 | 12/2015 | Tang | |
| 2018/0105390 | A1 * | 4/2018 | Salmikuukka | B66B 19/007 |
| 2019/0135580 | A1 * | 5/2019 | Scoville | B66B 1/468 |
| 2021/0039919 | A1 * | 2/2021 | Wu | B66B 13/143 |
| 2023/0373747 | A1 * | 11/2023 | King | B66B 3/006 |

FOREIGN PATENT DOCUMENTS

| | | | | | |
|---|---|---|---|---|---|
| EP | 3536647 | A1 | * | 9/2019 | B66B 1/3415 |
| JP | 2014504998 | A | * | 2/2014 | B66B 1/2458 |
| JP | 2018080033 | A | * | 5/2018 | |
| JP | 2019199337 | A | * | 11/2019 | |
| JP | 6819762 | B1 | * | 1/2021 | |
| JP | 7001131 | B1 | * | 1/2022 | |
| KR | 101146939 | B1 | * | 5/2012 | B66B 1/468 |
| KR | 20130101118 | A | * | 9/2013 | B66B 1/14 |
| KR | 20180133222 | A | * | 12/2018 | H04W 4/023 |
| WO | WO-2014116182 | A1 | * | 7/2014 | B66B 1/468 |
| WO | WO-2016064116 | A1 | * | 4/2016 | B66B 1/52 |
| WO | 2017103085 | A1 | | 6/2017 | |

* cited by examiner

SYSTEMS AND METHODS FOR TOUCHLESS ELEVATOR CAB REQUESTS

TECHNICAL FIELD

The present disclosure generally relates to requesting elevator cabs and, more particularly, to systems and methods for touchless requests for elevator cabs.

BACKGROUND

Current elevator systems generally require a user to manually touch some kind of user input to request an elevator cab or to select a destination floor. Further, current elevator systems may restrict destination floors permissible to users. For example, hotels, commercial buildings, and government buildings may require users to first scan a unique identification (e.g., a room key, a badge, or and/or other identification) and then touch the user input that corresponds to the requested destination floor. Such scanners may be positioned within the elevator cab itself such that the user scans their identification and immediately chooses which destination floor by pressing or otherwise manually selecting the desired destination floor. Other times, scanners are positioned outside of the elevator cab such that the elevator cab cannot be requested until the user scans a valid identification. Further, in these systems, the user may generally enter any of the available elevator cabs that travel to the destination floor.

Accordingly, a need exists for a touchless request for an elevator cab and a touchless request for a destination floor.

SUMMARY

In one embodiment, a system for a touchless request for an elevator cab is provided. The system for a touchless request for an elevator cab includes an elevator controller, a processor communicatively coupled to the elevator controller, and a non-transitory, processor-readable storage medium in communication with the processor. The non-transitory, processor-readable storage medium comprising one or more programming instructions cause the processor to: receive a unique identification from a user, determine a current floor (i.e. a call floor) for which the unique identification was provided, access a data storage device to determine a destination floor access permission based on the unique identification, determine a destination landing to which the cab should travel based on the destination floor access permission, send an elevator cab request command to the elevator controller to request that the elevator cab travel to the current floor (i.e. a call floor) and to the destination landing, and generate a notification for the elevator cab, which cab is assigned by the elevator controller to travel between the current floor (i.e. a call floor) and the destination landing.

In another embodiment, a method for a touchless request for an elevator cab is provided. The method includes receiving, by an elevator cab request module, a unique identification from a user, determining, by the elevator cab request module, a current floor (i.e. call floor) for which the unique identification was provided, accessing, by the elevator cab request module, a data storage device to determine a floor access permission based on the unique identification, and determining, by the elevator cab request module, a destination landing to which the cab should travel based on the floor permission. The method continues by sending, by the elevator cab request module, an elevator cab request command to an elevator controller to request that the elevator cab first travel to the current floor (i.e. call floor) and then travel to the selected destination landing, acknowledging, by the elevator controller, the elevator cab request command and assigning the elevator cab to service the elevator call, sending, to the elevator cab request module by the elevator controller, an assigned elevator cab data that corresponds to the assigned elevator cab, and generating, by the elevator cab request module, a notification as to which elevator cab is assigned by the elevator controller to service the call and travel between the current floor (i.e. call floor) and the destination landing.

In yet another embodiment, an elevator system for a touchless request for an elevator cab is provided, the elevator system further including an elevator cab request module, an elevator controller, and an access control device. The system including the elevator cab request module includes a processor communicatively coupled to both of the elevator controller and the access control device, a notification device communicatively coupled to the processor, a unique identifier device communicatively coupled to the processor, and a storage medium in communication with the processor. The storage medium has one or more programming instructions that, when executed, cause the processor to: receive a unique identification from a user via the unique identifier device, determine a current floor (i.e. a call floor) at which the user is located based on a floor from which the unique identification was provided, access a data storage device to determine a plurality of destination floor access permissions assigned to the unique identification, notify the identified user on the notification device of a first destination floor choice selection option, determine whether the unique identification was received a second time from the user via the unique identifier device to indicate the selection by the identified user of the first destination floor choice, when determined that the unique identification was not received a second time from the user via the unique identifier device, notify the identified user on the notification device of a second destination floor choice option, determine whether the unique identification was received a second time from the user via the unique identifier device to indicate the selection by the user of the second destination floor choice, when determined that the unique identification was not received a second time from the user via the unique identifier device, notify the user on the notification device of an "N" destination floor choice option of the plurality of destination floor access permissions assigned to the unique identification, determine whether the unique identification was received the second time from the user via the unique identifier device to indicate the selection by the user of the "N" destination floor choice, when determined that the unique identification was received a second time from the user via the unique identifier device to indicate the selection by the user of a destination floor selection of the plurality of destination floor access permissions, send a cab request command to the elevator controller to request the elevator cab first travel to the current floor and then travel to the selected destination floor, and generate a notification indicating which elevator cab is assigned by the elevator controller to travel between the current floor and the destination floor selection.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1A:
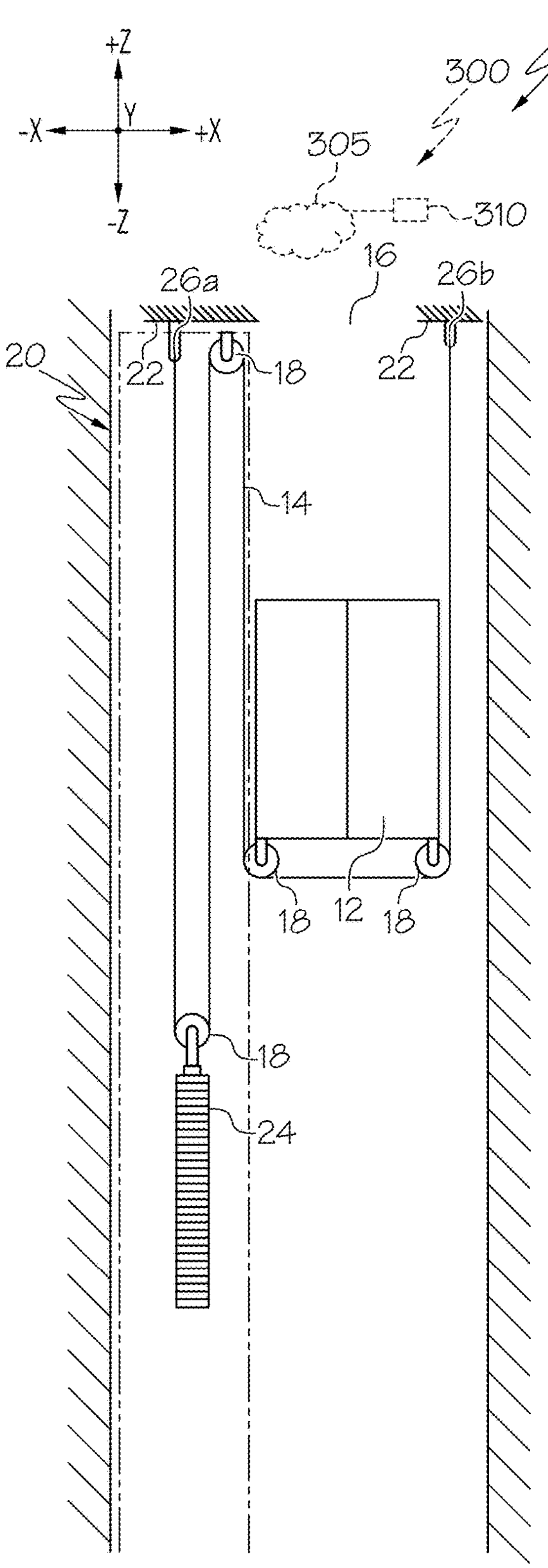
FIG. 1A schematically depicts a first aspect of an example elevator assembly schematic, according to one or more embodiments shown and described herein.

Embodiments of the present disclosure are directed to improved systems and methods for touchless elevator cab request and destination floor requests. More specifically, the disclosed systems and methods provide an approach to request an elevator cab and provide a destination request of a user without the need for the user to physically touch a commonly used user input. As such, in times where microorganisms, germs and disease are spread through touching of non-personal objects, touchless systems and methods described herein are desirable. As described herein, a touchless elevator cab request system may be used in elevator systems with a single elevator and destination floor and/or in elevator systems with a plurality of elevator cabs and a plurality of destination floors.

Specifically, an elevator cab request module, such as a kiosk, may include a notification device, a processing device, and a unique identifier device. The elevator cab request module is positioned outside of an elevator cab and is communicatively coupled to an elevator controller. The elevator cab request module may include the user identifier device configured to receive a unique user identification from the user to identify the user. The user identifier device may be positioned as a component of the elevator cab request module or may be remote form the elevator cab request module. Once the user is identified, the elevator cab request module provides the user with available destination floors via the notification device (e.g., unlocked destination floors that the user is permitted to access), via visual notification, audible notifications, and/or tactile feedback methods such as braille, vibration, and/or the like, on a tactile device.

Should there only be a single permissible destination floor, other than the user's current floor (i.e. the call floor), made available to be selected by the user, the processing device of the elevator cab request module may automatically send a request to the elevator controller to dispatch an elevator cab to the user's location. The elevator controller assigns the available elevator cab and communicates a unique identifier corresponding to the assigned elevator cab to the elevator cab request module. A notification of the assigned cab is provided to the user. The notification may be provided by the notification device of the elevator cab request module displaying the unique identifier of the elevator cab, which may be a map view with the assigned elevator cab highlighted or distinguished in some manner, and/or the like, such that the user visually receives an indication of which elevator cab to get into when the elevator cab reaches the current floor on which the user is located. The notification may be one or more of an audible alert that audibly instructs the user as to which elevator cab to enter, and/or a tactile alert that notifies the user via braille, vibration, and/or other tactile methods or mechanisms on the tactile device as to which elevator cab is assigned to the user.

Should there be multiple destination floors that are available to be selected by the user, the notification means (i.e., display device, audible device, and/or tactile device) may inform the user to select one of the multiple destination floors. For example, the display device may display one destination floor at a time, waiting on the user to acknowledge or select a desired destination floor by the user providing or inputting the unique identification a second time when the desired destination floor is displayed, or otherwise distinguished, on the display device. Once the destination floor is chosen, the processing device of the elevator cab request unit sends a request to the elevator controller to provide or dispatch the elevator cab to the user at the user's current floor. Again, the elevator controller assigns the available elevator cab and communicates a unique identifier of the assigned elevator cab to the elevator cab request module. The user is notified of the assigned elevator cab by the notification device via one or more of a visual, audible, or tactile alert or notification. For example, the display device of the elevator cab request module may display the unique identifier, such as on a map view, of the elevator cab such that the user visually receives an indication of which elevator cab to get into when the elevator cab reaches the current floor (i.e. call floor) on which the user is located.

Various systems and methods for the touchless elevator cab request system are described in detail herein.

The phrase "communicatively coupled" is used herein to describe the interconnectivity of various components of the monitoring system for elevator assemblies and means that the components are connected either through wires, optical fibers, or wirelessly such that electrical, optical, data, and/or electromagnetic signals may be exchanged between the components. It should be understood that other means of connecting the various components of the system not specifically described herein are included without departing from the scope of the present disclosure.

Referring now to the drawings, FIG. 1A depicts an elevator assembly schematic that illustrates various components for a first aspect of an example elevator assembly 10. In this aspect, the example elevator assembly 10 may include an elevator cab 12, a plurality of elevator hoisting members 14 illustrated for schematic reasons as a single suspension member and herein referred to as hoisting members, a hoistway 16 or elevator shaft, a plurality of sheaves 18, an example frame 20, and a plurality of weights 24 that act as a counterweight to the elevator cab 12. The plurality of weights 24 move within the example frame 20 in the system vertical direction (i.e., in the +/−Z direction). The example frame 20 may be an elevator frame, a counterweight elevator frame, and/or the like, as discussed in greater detail herein. The plurality of elevator hoisting members 14 include a distal end 26*a* and a proximate end 26*b*.

Further, in this aspect, as illustrated and without limitation, the example frame 20 includes two sheaves of the plurality of sheaves 18. For example, one sheave is fixedly mounted to an upper portion of the example frame 20 positioned in an upper portion of the hoistway 16 above the elevator cab 12 in a vertical direction (i.e., in the +/−Z direction) and another sheave moves with the weights 24 as the elevator cab 12 moves between various destination landings. This is non-limiting, and any number of the plurality of sheaves 18 may be mounted anywhere within the hoistway 16 and there may be more than or less than the two sheaves illustrated as being in the example frame 20.

At least one of the plurality of sheaves 18 within the hoistway 16 may include a motor such that the sheave is a traction sheave capable of driving the plurality of elevator hoisting members 14 through a plurality of lengths between the elevator cab 12 and the traction sheave. Further, the plurality of sheaves 18 may further include a plurality of idler sheaves that may also be mounted at various positions in the hoistway 16, and, in this aspect, are also coupled to the elevator cab 12. Idler sheaves are passive (they do not drive the elevator hoisting members 14, but rather guide or route the plurality of elevator hoisting members 14) and form a contact point, or engagement point, with the elevator cab 12. The plurality of elevator hoisting members 14 and the plurality of sheaves 18 move the elevator cab 12 between a plurality of positions within the hoistway 16 including to a plurality of destination landings and a plurality of call floors. The plurality of sheaves 18 may include any combination of traction type sheaves and idler type sheaves.

As illustrated in FIG. 1A, the elevator assembly 10 is an underslung system, with the idler sheaves positioned on a bottom surface of the elevator cab 12. Each of the plurality of elevator hoisting members 14 may be movably coupled to the traction sheave and a portion of the plurality of elevator hoisting members 14 may be coupled to the bottom surface of the elevator cab 12 to suspend the elevator cab 12 via the idler sheaves. As such, the elevator hoisting members 14 pass under the elevator cab 12 on a bottom of the elevator cab 12 via the idler sheaves, and are coupled at the top of the hoistway 16 under tension to various structures, such as to the example frame 20, a plurality of rail caps 22, and/or the like. For example, the proximate end 26*b* of the plurality of elevator hoisting members 14 may be fixedly coupled to the rail caps 22 and the movably coupled portion of the plurality of elevator hoisting members 14 are under tension to move the elevator cab 12 between various landings (e.g., call floors and/or destination landings). The example frame 20 may include a dead end hitch, at least one of the plurality of rail caps 22, or other structural components.

Figure 1B:
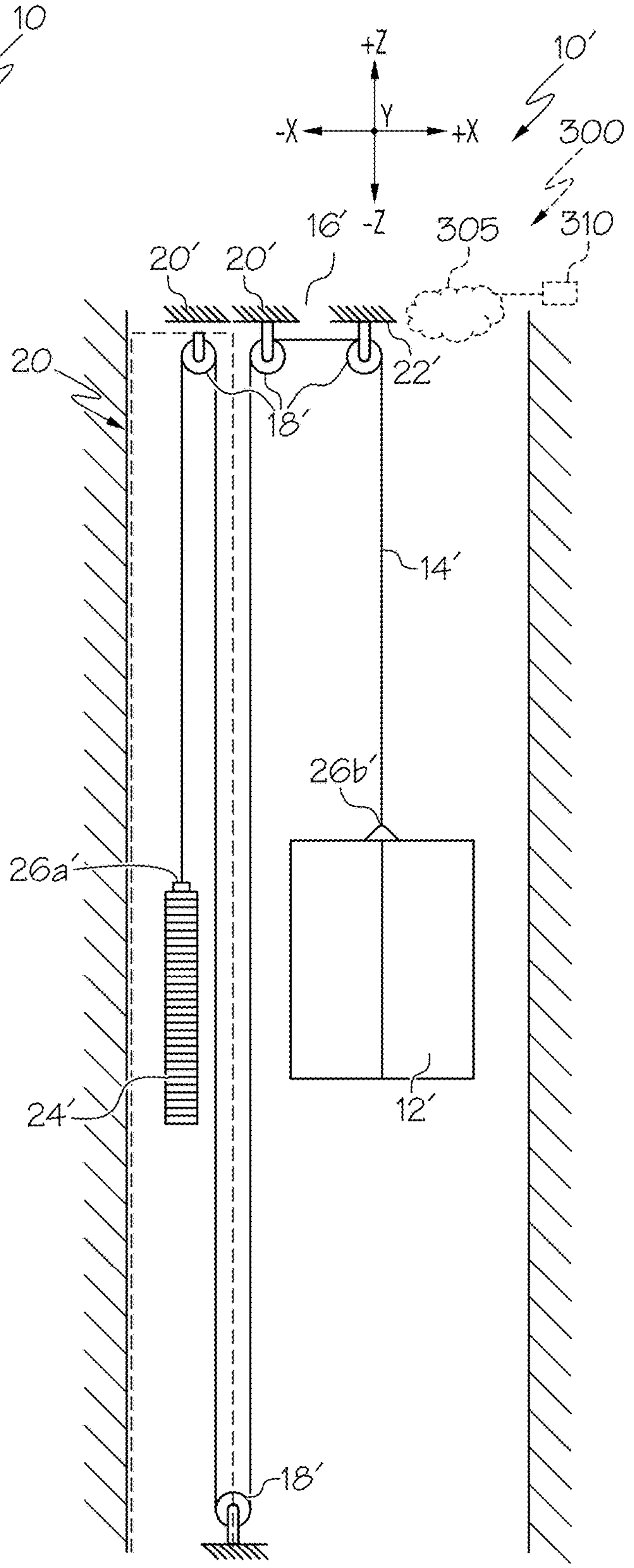
FIG. 1B schematically depicts a second aspect of an example elevator assembly schematic, according to one or more embodiments shown and described herein.

Referring now to FIG. 1B, a schematic illustrating various components for a second aspect of an example elevator assembly 10' is depicted. It should be appreciated that in the discussion herein, the elevator assembly 10, and components thereof, may refer to either elevator assembly 10, 10'. In this aspect, the elevator assembly 10' may include an elevator cab 12', a plurality of elevator hoisting members 14' illustrated for schematic reasons as a single suspension member, a hoistway 16' or elevator shaft, a plurality of sheaves 18', such as traction sheaves and/or idler sheaves, an example grounded frame 20', and a plurality of weights 24' that move within the example frame 20' in the system vertical direction (i.e., in the +/−Z direction). The plurality of elevator hoisting members 14' include a distal end 26*a'* and a proximate end 26*b'*. In this aspect, the plurality of elevator hoisting members 14' extend a length between the weights 24' and the elevator cab 12'. Further, in this aspect, at least one of the plurality of sheaves 18' is a traction sheave, which, for example, may be mounted to a lower surface of the hoistway 16'. This is non-limiting, and the traction sheave of the plurality of sheaves 18' may be mounted anywhere within the hoistway 16' and the plurality of sheaves 18' may include a plurality of idler sheaves and at least one traction sheave. It should be appreciated that the traction sheave may include a motor such that at least one of the plurality of sheaves 18' is a device to drive the plurality of elevator hoisting members 14' through a plurality of lengths with respect to the length between the traction sheave and the contact point of the elevator cab 12'. The idler sheaves may also be mounted at various positions in the hoistway 16' including within the example frame 20'. The idler sheaves are passive (they do not drive the plurality of elevator hoisting members 14' but rather guide or route the plurality of elevator hoisting members 14'). The plurality of elevator hoisting members 14' are coupled to the elevator cab 12' to form the contact point. The elevator hoisting members 14' are coupled at the top of the hoistway 16' under tension to various structures, such as to the example frame 20' a plurality of rail caps 22', and/or the like.

It should be appreciated that the illustrated schematics of FIGS. 1A-1B are merely examples and that the plurality of elevator hoisting members 14 routing may vary significantly or slightly from these illustrated schematics. For example, there may be several idler sheaves positioned in the hoistway 16 between the traction sheave and the contact point with the elevator cab 12.

Figure 2:
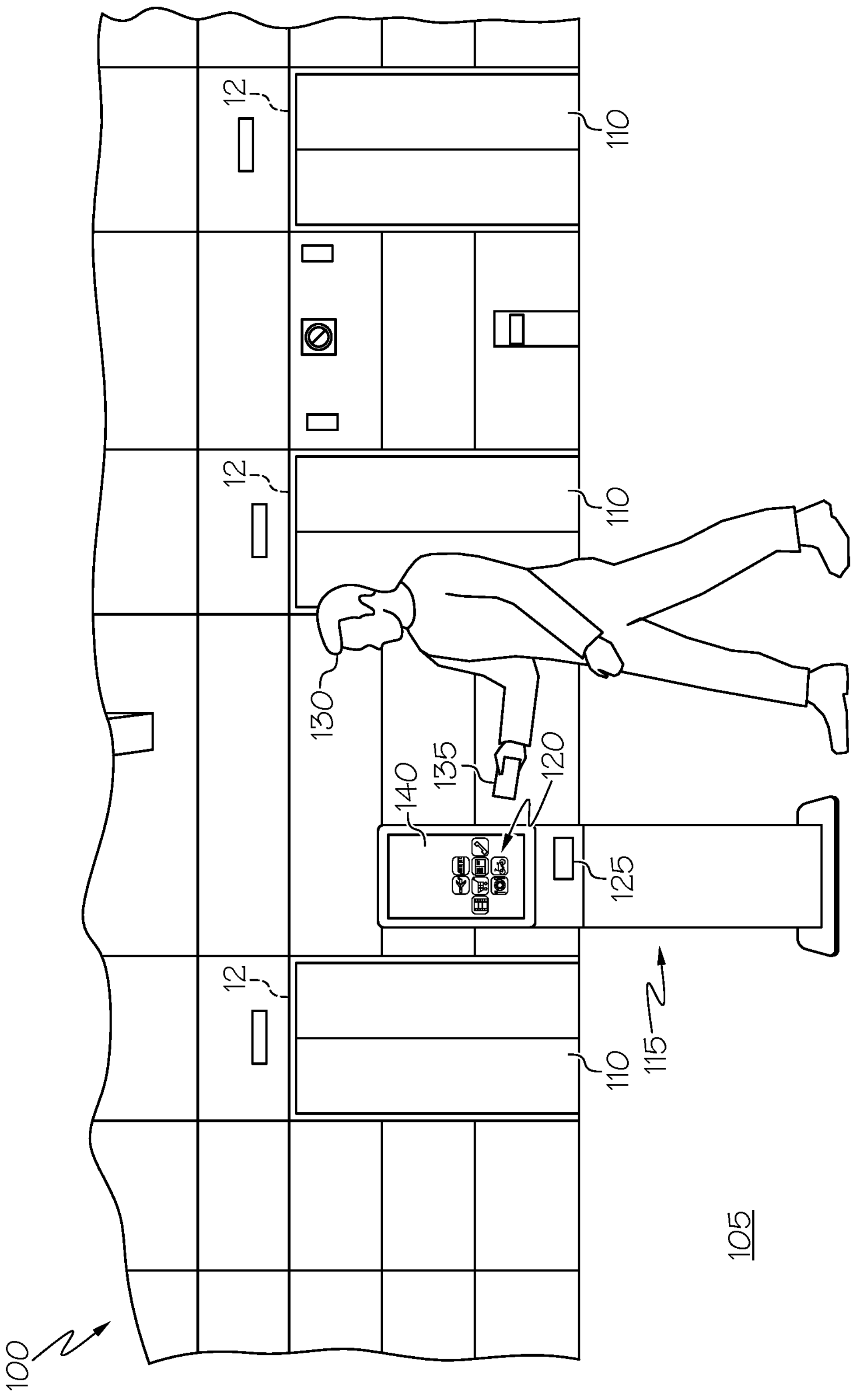
FIG. 2 schematically depicts a partial perspective view of a lobby having an elevator cab request module and a plurality of elevator cabs of FIG. 1A according to one or more embodiments described and illustrated herein.

Referring back to FIG. 1A and now to FIG. 2 in which a partial environmental view of an example lobby 100 of a current floor 105 (i.e., call floor) of a building is schematically depicted. Further depicted are a plurality of elevator cabs 12 with their respective door 110 in a closed position. An elevator cab request module 115, such as a kiosk, is also positioned in the example lobby 100. It should be appreciated that this is merely an example and the elevator cab request module 115 may be positioned on any floor in any type of building and not necessarily positioned in the example lobby 100. Furthermore, the elevator cab request module 115, or kiosk, may be such loosely defined to include any accessible inputs ranging from a physical station to a mobile application loaded into a smartphone, tablet, personal computer, smart watch, and/or the like. As such, as described in greater detail with respect to FIG. 3, the elevator cab request module 115 is part of an illustrative touchless elevator cab request system 300 (FIG. 3).

Further, while FIG. 2 depicts three elevator cabs 12, this is non-limiting and there may be more or less than three elevator cabs 12 in the example lobby 100. Moreover, while FIG. 2 depicts the elevator cabs 12 with doors 110 that move between an open position and a closed position, as depicted in FIG. 2, this is merely illustrative. Each of the elevator cabs 12 may have a gate, a fence, a barrier, or simply may not have a door and may be open.

Still referring to FIGS. 1A and 2, the elevator cab request module 115 may include a notification device 120. The notification device 120 may be a display device, an audible device, and/or a tactile device. That is, it should be understood that the notification device 120 may include a display device, an audible device, a tactile device and/or combinations thereof. The elevator cab request module 115 may further include a unique identifier device 125. That is, in some embodiments, the unique identifier device 125 may be a component of the elevator cab request module 115. In other embodiments, the unique identifier device 125 may be remote from, or separate from the component of the elevator cab request module 115. For example, the unique identifier device 125 may be a stand-alone device positioned within the lobby 100 or a personal mobile electronic device such as a smart phone, tablet, laptop, and the like, that is communicatively coupled to the elevator cab request module 115, or other components of an illustrative touchless elevator cab request system 300 (FIG. 3), as discussed in greater detail herein. Further, in other embodiments, the unique identifier device 125 may be part of, or a component of, an access control device 315 (FIG. 3). The unique identifier device 125 may be configured to capture a plurality of unique identification data from a user 130 via a plurality of data sources 135. For example, the plurality of data sources 135 may include a barcode, a QR (quick response) code, a radio frequency identification (RFID), an application of the personal mobile electronic device (e.g., a laptop, smart phone, tablet, smart watch, and/or the like) (mobile communication application), biometric technologies such as a fingerprint, facial recognition, iris and retina information, voice recognition and/or the like, and personal identification information such as a password or a passcode, and/or the like. In some embodiments, each of the plurality of data sources 135 may be independently used to communicate with the unique identifier device 125, which in turn communicates with the elevator cab request module 115, and/or the access control device 315 (FIG. 3), and/or an elevator controller 310 (FIG. 3) as discussed in greater detail herein. As such, use of the plurality of data sources 135 permit the now identified user 130 to only be in physical contact with the plurality of data sources 135 (e.g., the user 130 only needs to physically touch the plurality of data sources 135) and does not require the identified user 130 to touch or otherwise be in contact with the elevator cab request module 115 or any other component of the elevator assembly 10 or the illustrative touchless elevator cab request system 300 (FIG. 3), as discussed in greater detail herein. In other embodiments, a combination of the plurality of data sources 135 may be used to communicate with the unique identifier device 125. For example, the identified user 130 may be required to provide a barcode and a fingerprint, or the identified user 130 may provide a passcode and the barcode. As such, the combination of the plurality of data sources 135 is non-limiting and there may be more than two unique combinations of data sources 135 used to communicate with the unique identifier device 125.

Figure 3:
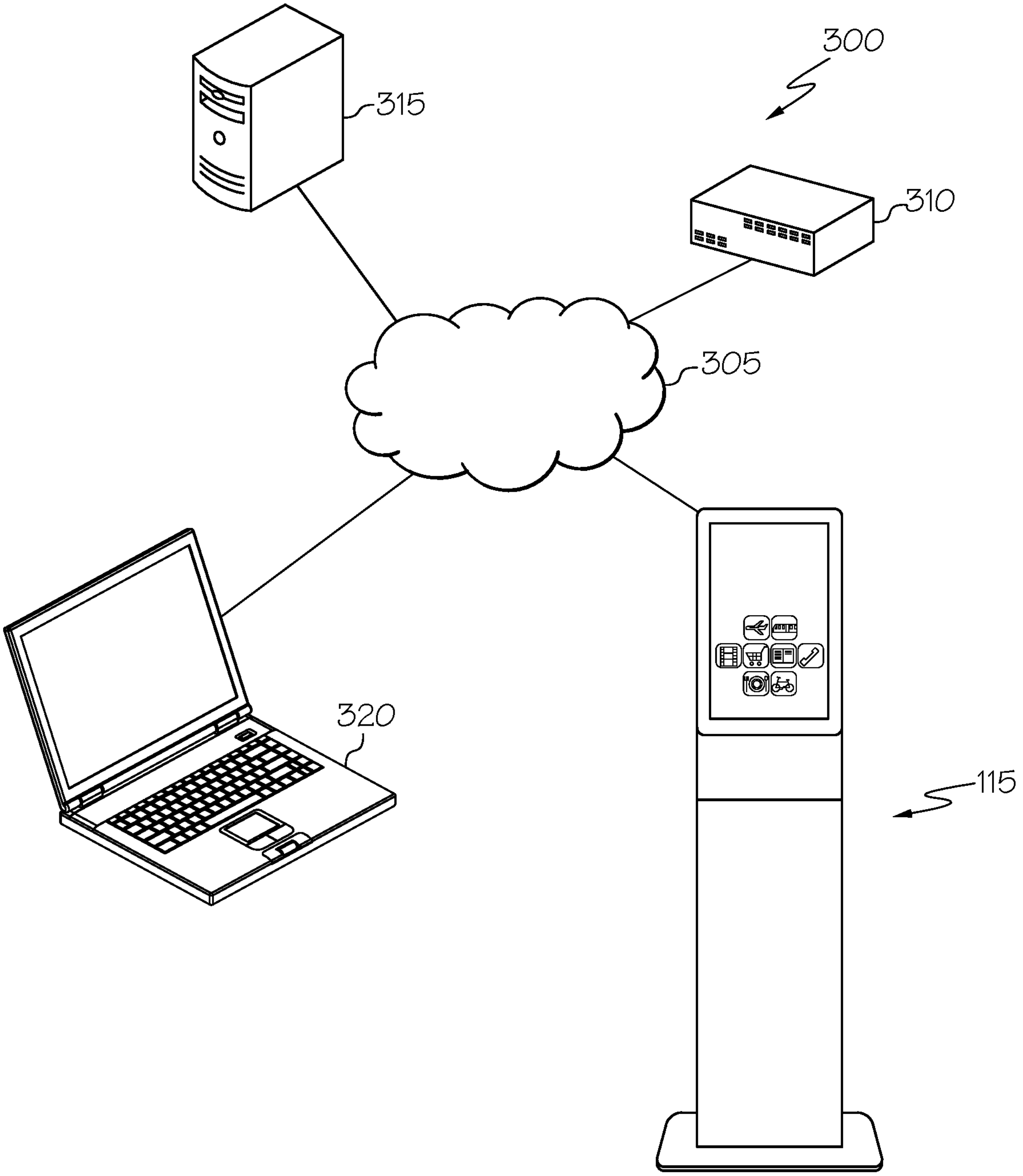
FIG. 3 schematically depicts an illustrative touchless elevator cab request system having components for touchless request for the elevator cabs of FIG. 2 according to one or more embodiments described and illustrated herein.

Referring still to FIGS. 1A and 2, and now to FIG. 3, in which components of the illustrative touchless elevator cab request system 300 configured for touchless elevator requesting and notification of the selected elevator cab 12 are schematically depicted. The illustrative touchless elevator cab request system 300 may generally be configured to communicatively couple one or more computing devices via a network 305, such as the elevator cab request module 115, the elevator controller 310 of the elevator assembly 10, the access control device 315, and an administrator computing device 320. Further, it should be appreciated that these devices may be local to the elevator assembly 10, may be remote from the elevator assembly 10, and/or combinations thereof.

The computer network 305 may include a wide area network (WAN), such as the internet, a local area network (LAN), a mobile communications network, a public service telephone network (PSTN) a personal area network (PAN), a metropolitan area network (MAN), a virtual private network (VPN), and/or another network. Some components of the computer network 305 may be wired to one another using Ethernet (e.g., the elevator cab request module 115 to the elevator controller 310, and/or the like) or hard wired to one another using conventional techniques known to those skilled in the art.

The components and functionality of the elevator cab request module 115 will be set forth in detail below.

The access control device 315 may be a part of the elevator cab request module 115 or a separate device communicatively coupled to the elevator cab request module 115. The access control device 315 may receive data from one or more sources, store the data, and provide information from certain portions of the data to the elevator cab request module 115 in the form of identification verification information for specific users such as whether the identified user 130 has access to the elevator cabs 12, destination floor access permission information, and the like, as described in greater detail herein. As such, the access control device 315 may provide or transmit data to an external device, such as the elevator cab request module 115 and/or the elevator controller 310, to unlock destination floors to which the identified user 130 is permitted to access, provide destination floor choices selection option to the elevator cab request module 115, and/or the like. It should be appreciated that in other embodiments, the destination floor access permissions information based on the unique identifications may be stored in a data repository that is not within the illustrative touchless elevator cab request system 300 but may be wired or wirelessly connected via the network 305. Further, the elevator controller 310, in response to the data about the specific identified user provided by the access control device 315, may unlock the destination floors to which the identified user 130 is permitted to access and provide those unlocked destination floors to the access control device 315 and/or to the elevator cab request module 115 for notification to the identified user 130.

Still referring to FIGS. 1A, 2 and 3, the elevator cab request module 115 may generally provide an interface between the identified user 130 and the other components connected to the illustrative touchless elevator cab request system 300. In some embodiments, the elevator cab request module 115 may be a user-facing device, such as any personal mobile electronic device. For example, a laptop, mobile phone, tablet, desktop computer, and/or the like, that is positioned remote to the elevator controller 310. In other embodiments, the elevator cab request module 115 may be a human machine interface (HMI) or other electronic computing device positioned at, and/or communicatively coupled to, the elevator controller 310. The elevator cab request module 115 may be used to perform one or more user-facing functions, such as receiving one or more touchless inputs or data from the user and/or from the elevator controller 310 and/or from the access control device 315. The elevator cab request module 115 may present the identified user 130 with a graphical user interface 140 that visually displays data, permits the identified user 130 to interact with the data, such as requesting the elevator cab 12 to specific destination floors, and/or the like, as discussed in greater detail herein.

Additionally, included in FIG. 3 is the administrator computing device 320. In the event that the elevator cab request module 115 and/or the access control device 315 require oversight, updating, or correction, the administrator computing device 320 may be configured to provide the desired oversight, updating, and/or correction. The administrator computing device 320 may also be used to input additional data into a data storage portion of the access control device 315, the elevator cab request module 115, the elevator controller 310, and/or the like. For example, the administrator computing device 320 may edit specific unique user identities, specific destination floor access permissions, current floor identification of the elevator cab request module 115, and/or the like. It should be appreciated that each identified user 130 of the illustrative touchless elevator cab request system 300 is provided with the unique identification that will need to be updated from time to time to add additional users, remove users, update floor access permissions of users, and/or the like. The administrator computing device 320 may also be used to connect additional elevator cab request modules, replace elevator cab request modules, and/or the like, to the network 305 of the illustrative touchless elevator cab request system 300.

Still referring to FIGS. 1A, 2 and 3, the elevator controller 310 provides commands to the traction sheaves 18 to drive the elevator cabs 12, actuators of the elevator cab 12 to open or close the doors, and/or the like. In some embodiments, the elevator controller 310 may determine and/or unlock the at least one destination floor that the identified user 130 is permitted to access and transfer data to the elevator cab request module 115, the access control device 315, and/or the like. Further, the elevator controller 310 may communicate movements of the elevator cabs 12, such as which elevator cab 12 is assigned to the specific request made by the identified user 130 (e.g., movement from the current floor 105, or call floor, to the desired destination floor), to the elevator cab request module 115, and/or to the access control device 315. As such, the elevator controller 310 may receive data from various sensors, programming controls, and/or the like, make determinations and calculations, output data, and control the elevator assembly 10 through sequences of operation and real-time determinations based on floor requests, permitted destination floors, and available elevator cabs 12. Therefore, the elevator controller 310 may contain the requisite processing device, hardware, software, and/or the like, to perform the functionalities relating to moving the elevator cabs 12, the hoisting members 14, the traction sheaves 18, the doors 110, and the like, between a plurality of landings (e.g., call floors and/or destination landings), stopping at specific landings (e.g., call floors and/or destination landings), and/or the like, generally associated with the elevator assembly 10, determinations of available elevator cabs 12, determinations of destination floor access permissions for the identified user 130, output of data regarding assigned elevator cab 12, and the like.

It should be understood that the illustrative touchless elevator cab request system 300 and components thereof (e.g., the elevator cab request module 115, the elevator controller 310, the access control device 315, and/or the like) may gather and transform data for a touchless request for the elevator cab 12 and for providing the identified user 130 with a notification of which elevator cab 12 is assigned. For example, the notification may be a visual indicator displayed on the graphical user interface 140 of the notification device 120 indicating which is the assigned elevator cab 12, rather than using conventional techniques, such as a user merely touching a user input to indicate a desired destination floor to the elevator system. Other examples include the notification device 120 notifying the identified user 130 via the audible alert and/or the tactile alert via braille, vibration, and/or other sensory methods. As such, the components of the illustrative touchless elevator cab request system 300 transform touchless and wireless data into an elevator cab request signal received by the access control device 315 and/or the elevator controller 310 and the elevator controller 310 returns a confirmation signal data indicating which elevator cab 12 is assigned for the identified user 130. The data is again transformed and either displayed by the elevator cab request module 115, used in tactile communication via the tactile device, or used as an audible alert via the audio device, using various logic modules, algorithms, other software and hardware, as discussed in greater detail herein. Such techniques permit touchless elevator cab requests, as discussed in greater detail herein.

For example, the elevator cab request module 115 may further include a processor 404 (FIG. 4A) that is communicatively coupled to the elevator controller 310, to the notification device 120, to the unique identifier device 125, and to a data storage device 418 (FIG. 4A), as discussed in greater detail herein. The elevator cab request module 115 may be configured to recognize a unique identity of the identified user 130 via the plurality of data sources 135 such that the identification of the identified user 130 is touchless (i.e. identification of the identified user 130 is made by the system without the need for the identified user 130 to make physical contact with any part of the elevator system). In other embodiments, the access control device 315 recognizes a unique identity of the identified user 130 via the plurality of data sources 135 such that the identification of the user 130 is touchless. Once the user 130 is identified (i.e., becomes the identified user 130), the elevator cab request module 115 and/or access control device 315 may be configured to provide, via the notification device 120, the identified user 130 with a listing of, and the ability to touchlessly select one of, the available destination floors to which the user has been granted access based on a plurality of destination floor access permissions associated or corresponding to the unique identify of the identified user 130. Should there only be a single permissible destination floor, the processor 404 (FIG. 4A) of the elevator cab request module 115 and/or the access control device 315 sends a request to the elevator controller 310 to provide the elevator cab 12 for the identified user 130, as discussed in greater detail herein. The elevator controller 310 assigns the available elevator cab 12 and communicates a unique identifier of the assigned elevator cab 12 to the elevator cab request module 115. In some embodiments, the notification device 120 of the elevator cab request module 115 displays the unique identifier of the elevator cab 12 such that the identified user 130 visually receives an indication of which of the elevator cabs 12 to get into when the elevator cab 12 reaches the current floor 105 (i.e., call floor) of the identified user 130. In other embodiments, the notification device 120 alerts the identified user 130 via audible notification and/or a tactile notification. Further, the notification may be more than one notification and may be a combination of visually displaying the notification, audibly outputting the notification, and/or tacitly outputting the notification.

Still referring to FIGS. 1A, 2, and 3, in other embodiments, the elevator controller 310 may receive a request for an elevator cab 12 from the identified user 130 directly from the elevator cab request module 115 and/or the access control device 315 and may determine and/or unlock the destination floor based on the destination floor access permissions associated or corresponding to the unique identify of the identified user 130. The elevator controller 310 may assign the elevator cab 12 and notify the identified user 130 via the elevator cab request module 115 and/or the access control system 315, which in turn notifies the identified user 130 via the notification device 120 (e.g., visual indicator alert, audible alert, and/or tactile alert).

Should there be multiple destination floors accessible to and available for selection by the identified user 130, the notification device 120 may display (or, in the alternative, provide audible or tactile notifications) one available destination floor at a time, waiting on the identified user 130 to select a desired destination floor by providing the user's unique identification, via the plurality of data sources 135, a second time when the desired destination floor is displayed, audibly alerted, and/or tacitly alerted, so as to be otherwise distinguished by the notification device 120. Once the destination floor is chosen, the processor 404 of the elevator cab request module 115 sends a request to the elevator controller 310 to provide the elevator cab 12 for the identified user 130. The elevator controller 310 assigns the available elevator cab 12 and communicates a unique identifier of the assigned elevator cab 12 to the notification device 120. The notification device 120 of the elevator cab request module 115 notifies the identified user 130 of the assigned elevator cab 12 by audibly alerting, tactile alerting, and/or visually alerting via displaying the unique identifier of the elevator cab 12 such that the identified user 130 receives an indication (either visually, audibly, and/or tacitly) of which of the elevator cabs 12 to get into when the elevator cab 12 reaches the current floor 105 (i.e., call floor) of the identified user 130.

It should be understood that while the administrator computing device 320 is depicted as a personal computer, the elevator cab request module 115 is depicted as a kiosk, the access control device 315 is depicted as a server, and the elevator controller 310 is depicted as a generic controller, these are merely examples. More specifically, in some embodiments, any type of computing device (e.g., mobile computing device, personal computer, server, and the like) may be utilized for any of these components. Additionally, while each of these computing devices is illustrated in FIG. 3 as a single piece of hardware, this is also an example. More specifically, each of the administrator computing device 320, the elevator cab request module 115, the access control device 315, and the elevator controller 310 may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 4A:
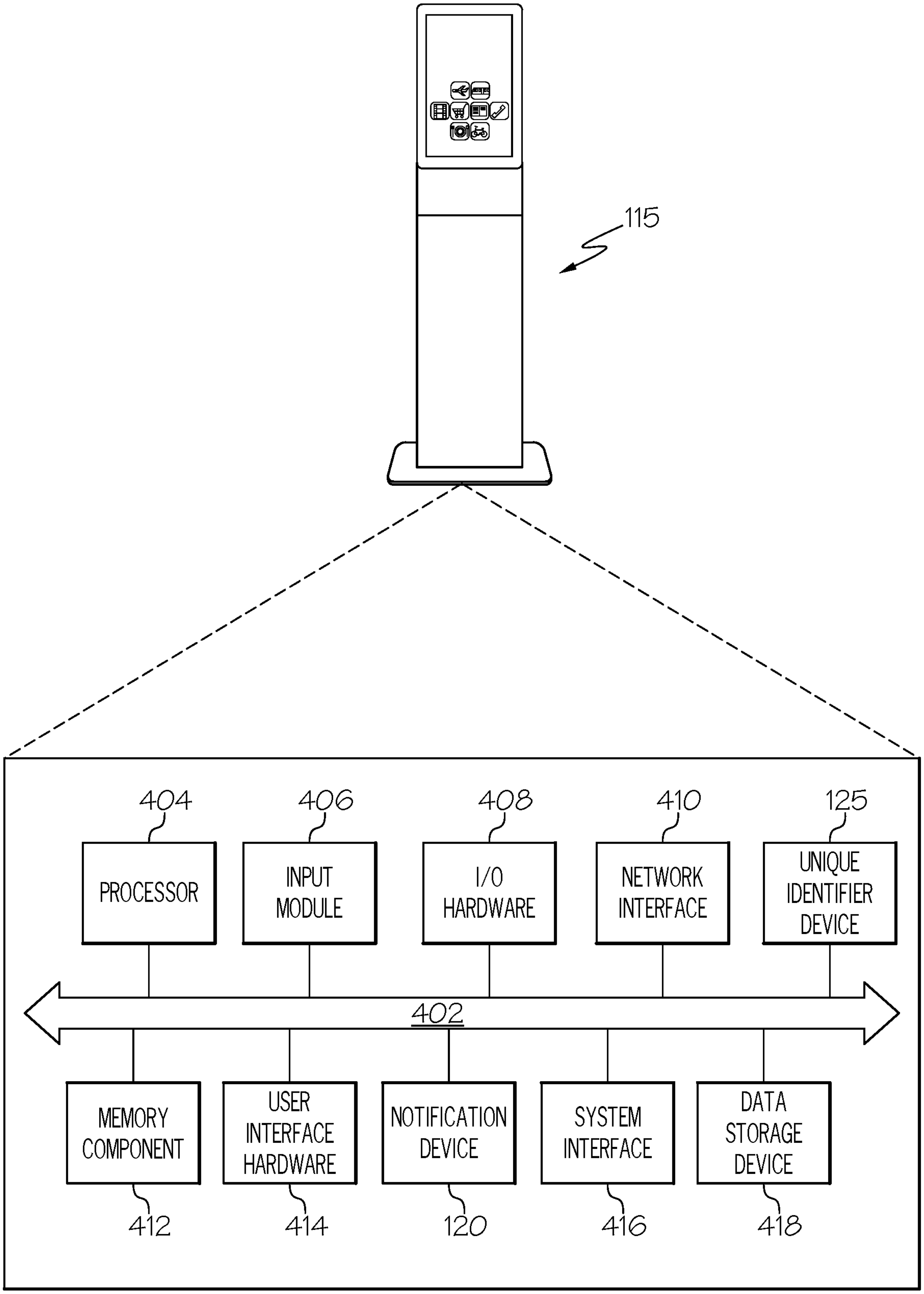
FIG. 4A schematically depicts illustrative hardware and software components of the elevator cab request module of FIG. 2 according to one or more embodiments described and illustrated herein.

Now referring to FIG. 1A and also to FIG. 4A, where FIG. 4A depicts the various components of the elevator cab request module 115. The various components of the elevator cab request module 115 may identify a unique identification to establish the user 130, may determine the current floor 105 (i.e., call floor) of the identified user 130 and may determine and/or receives data with respect to the destination floor access permissions and the desired destination floor by the identified user 130, may request and/or may receive data with respect to requesting an elevator cab 12 to travel between the current floor 105 (i.e., call floor) and the destination floor, and may provide notifications for the identified user 130 via the notification device 120 for the identified user 130 to understand which elevator cab 12 is assigned for the identified user 130 to use by utilizing hardware, software, and/or firmware, according to embodiments shown and described herein. The elevator cab request module 115 may include a non-transitory, computer readable medium configured for receiving data from various sources (e.g., the unique identifier device 125, the elevator controller 310, the access control device 315, and/or the like), performing the various functions described herein such as those discussed with respect to FIGS. 5-6, providing commands to request an elevator cab 12 to travel between the current floor 105 (i.e., call floor) and the destination floor, notifying data to the identified user 130, and/or the like, embodied as hardware, software, and/or firmware, according to embodiments shown and described herein.

While in some embodiments, the elevator cab request module 115 may be configured as a general purpose computer with the requisite hardware, software, and/or firmware, in other embodiments, the elevator cab request module 115 may be configured as a special purpose computer designed specifically for performing the functionality described herein. For example, the elevator cab request module 115 may be a specialized device that particularly receives unique information or data about the identified user 130, searches, indexes, or requests for data related destination floor access permission for the user 130 based on the unique data provided by the identified user 130 (e.g., provides unique identification to and/or requests data from the access control device 315), sends data commands to the elevator controller 310 and/or to the access control device 315, to request the elevator cab 12, receive confirmation data from the elevator controller 310, and displays information regarding the elevator cab 12 that has been assigned to the identified user 130 via the notification device 120.

In some embodiments, the elevator cab request module 115 receives and/or outputs data related to the unique identifier data gathered from the plurality of data sources 135 provided by the identified user 130 to external components (e.g., the access control device 315 and/or the elevator controller 310, which may be positioned remote to the elevator cab request module 115 and connected to the network 305 (FIG. 3)) for the purposes of enabling a touchless elevator cab request. In other embodiments, the elevator cab request module 115 generates and sends data to the administrator computing device 320 (FIG. 3), to the access control device 315, and/or the elevator controller 310 in which each may be positioned remotely from the elevator cab request module 115.

As also illustrated in FIG. 4A, in other embodiments, the elevator cab request module 115 may include the processor 404, an input module 406, an I/O hardware 408, a network interface hardware 410, a memory component 412, a user interface hardware 414, a system interface 416, and the data storage device 418, which stores a database of display data 450, an elevator controller data 452, an identification data 454, a floor data 456, and a notification data 458. The memory component 412 may be non-transitory computer readable memory. The memory component 412 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 412 may be configured to store operating logic 420, display logic 432, notification logic 434, elevator cab request logic 436, elevator cab confirmation logic 438, and identification logic 440 (each of which may be embodied as a computer program, firmware, or hardware, as an example). A local interface 402 is also included in FIG. 4A and may be implemented as a bus or other interface to facilitate communication among the components of the elevator cab request module 115.

The processor 404, such as a computer processing unit (CPU), may be the central processing unit of the elevator cab request module 115, performing logic operations to execute a program. The processor 404, alone or in conjunction with the other components, is an illustrative processing device, computing device, electronic control unit, or combination thereof. The processor 404 may include any processing component configured to receive and execute instructions (such as from the data storage device 418 and/or the memory component 412) and to perform the process described herein with respect to FIGS. 5-6.

Still referring to FIG. 4A, the unique identifier device 125 may include components capable of receiving data from the plurality of data sources 135. For example, as discussed above, the plurality of data sources 135 may include the barcode, quick response (QR) code, radio frequency identification (RFID), voice recognition, iris or retina scans, fingerprint, facial recognition, password, passcode, application of a personal mobile electronic device (e.g., a laptop, smart phone, tablet, smart watch, and/or the like), and/or the like. Further, as discussed above, in some embodiments, each of the plurality of data sources 135 may be independently used to communicate with the elevator cab request module 115 via the unique identifier device 125. As such, the unique identifier device 125 may provide communication between the elevator cab request module 115, the access control device 315, the elevator controller 310, and the identified user 130 via touchless methods. The unique identifier device 125 may be any commercially manufactured device that is capable of reading and transmitting data. The unique identifier device 125 may be remote from the elevator cab request module 115 such as physically positioned somewhere else in the lobby 100 or may be the personal mobile electronic device and/or the like that is personal to the identified user 130.

The I/O hardware 408 may communicate information between the local interface 402 and one or more other components of the illustrative touchless elevator cab request system 300 (FIG. 3). For example, the I/O hardware 408 may act as an interface between the processor 404 and other components, such as the unique identifier device 125, and/or the like. In some embodiments, the I/O hardware 408 may be utilized to transmit and/or receive data to/from other components of the illustrative touchless elevator cab request system 300 (FIG. 3) such as the access control device 315 (FIG. 3).

The network interface hardware 410 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 410 may provide a communications link between the elevator cab request module 115 and the other components of the illustrative touchless elevator cab request system 300 depicted in FIG. 3, including, but not limited to, the administrator computing device 320, the elevator controller 310, the access control device 315, and/or the like.

Still referring to FIG. 4A and back to FIG. 3, the system interface 416 may generally provide the elevator cab request module 115 with an ability to interface with one or more external devices such as, for example, the elevator controller 310, the access control device 315, the administrator computing device 320, and the like, as depicted in FIG. 3, such that the elevator cab request module 115 may transmit data and commands and receive data and commands. As such, the system interface 416 permits bidirectional communication between the elevator cab request module 115 and the other components of the illustrative touchless elevator cab request system 300 such as the elevator controller 310.

Still referring to FIG. 4A and back to FIG. 2, the user interface hardware 414 may provide the necessary hardware, software, and/or firmware for operation of the graphical user interface 140 displayed by the notification device 120 and/or one or more output devices such that information is conveyed to the user using audio, tactile and/or visual data formats. For example, visual data formats may include graphically, alphanumerically format and/or the like. Further, the notification device may receive inputs such as from other components or from the user. Illustrative output devices include, but are not limited to, monitors, speakers, headphones, projectors, wearable-displays, holographic displays, tactile device, and/or printers, for example. Further, the user interface hardware 414 may output the graphical user interface 140 that notifies the identified user 130 of the elevator cab 12 to enter to travel to the destination floor. The graphical user interface 140 may be configured to illustrate or display a unique identifier of the assigned elevator cab 12, a map view of the various available elevator cabs 12 with the assigned elevator cab 12 highlighted or distinguished in some manner to provide a visual indication to the identified user 130, and/or the like.

Figure 4B:
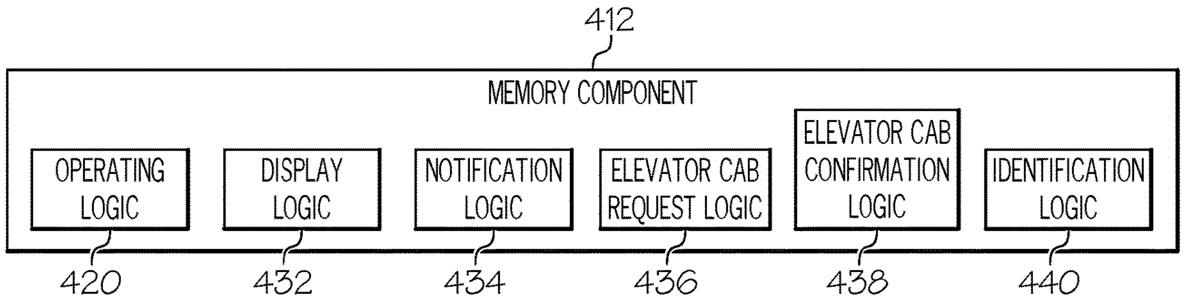
FIG. 4B schematically depicts an illustrative memory component containing illustrative logic components according to one or more embodiments shown and described herein.

With reference to FIG. 4B, in some embodiments, the program instructions contained on the memory component 412 may be embodied as a plurality of software modules, where each module provides programming instructions for completing one or more tasks. For example, FIG. 4B schematically depicts the memory component 412 containing illustrative logic components according to one or more embodiments shown and described herein. As shown in FIG. 4B, the memory component 412 may be configured to store various processing logic, such as, for example, operating logic 420, display logic 432, notification logic 434, elevator cab request logic 436, elevator cab confirmation logic 438, and identification logic 440 (each of which may be embodied as a computer program, firmware, or hardware, as an example). The operating logic 420 may include an operating system and/or other software for managing components of the elevator cab request module 115. Further, the operating logic 420 may contain one or more software modules for transmitting and receiving data, and/or analyzing data.

Still referring to FIG. 4B and now referring back to FIG. 2, the display logic 432 may contain one or more software modules for converting data into the graphical user interface 140 that may be displayed onto the notification device 120, such as real-time visual indicators of the assigned elevator cab 12 to take the identified user 130 to the destination floor. In some embodiments, the unique identifier of the assigned elevator cab 12 may be displayed via the graphical user interface 140 on the notification device 120. In other embodiments, the graphical user interface 140 may display the map view of the current floor 105 (i.e., call floor), the building, and/or the like, and may be highlighted, or otherwise distinguish the assigned elevator cab 12 for the identified user 130 to easily and readily understand which elevator cab 12 to enter when the elevator cab 12 stops at the current floor 105 (i.e., call floor) to permit entry, as discussed in greater detail herein.

The notification logic 434 may contain one or more software modules for communicating with the elevator controller 310 to receive the assigned elevator cab 12 to communicate or work in conjunction with the display logic 432 to notify the identified user 130 of the assigned elevator cab 12. The notification may be visual, as described with respect to the graphical user interface 140 and/or may also be an audio notification, tactile, or another means of notifying the identified user 130 which elevator cab 12 is assigned to take the identified user 130 to the chosen or unlocked destination floor.

Still referring to FIGS. 2 and 4B, and now also referring back to FIG. 3, the elevator cab request logic 436 may contain one or more software modules for communicating with the elevator controller 310 and/or the access control device 315, the identification logic 440, and the unique identifier device 125 to determine the current floor 105 (i.e., call floor) of the identified user 130 and the requested destination floor of the user 130. Once the current floor 105 (i.e., call floor) and destination floor of the identified user 130 are determined, the elevator cab request logic 436 may send a command directly to the elevator controller 310 and/or through the access control device 315 to the elevator controller 310 to request the elevator cab 12 to travel between the current floor 105 (i.e., call floor) and the destination floor.

The elevator cab confirmation logic 438 may contain one or more software modules for receiving a signal from the elevator controller 310 directly to the elevator cab request module 115 and/or from the elevator controller 310 through the access control device 315 and to the elevator cab request module 115. The signal is indicative of the assigned elevator cab 12 that will move between the current floor 105 (i.e., call floor) and the destination floor to move the identified user 130 as requested. As such, the notification logic 434 and the display logic 432 may use the signal from the elevator controller 310 to visually, audibly, and/or tacitly notify the identified user 130 of the assigned elevator cab 12 via the notification device 120, as discussed in greater detail herein.

The identification logic 440 may contain one or more software modules for receiving data from the unique identifier device 125 such as data from the plurality of data sources 135. The identification logic 440 may cross reference the data from the plurality of data sources 135 to establish the identified user 130 via the data storage device 418, the access control device 315, and/or some other data repositories that may be within or are remote from the elevator cab request module 115, combinations thereof, and/or the like. Further, the identification logic 440 may solely identify destination floor access permissions to specific destination floors associated with the identified user 130 via the data storage device 418, or work in conjunction with (e.g. collaborative or in combination with) other data repositories that are remote from the elevator cab request module 115, such as the access control device 315, or others, to identify permissions to/for destination floors associated with the identified user 130, or to which the identified user 130 is permitted access. The data storage device 418 may be a component of the elevator cab request module 115, the access control device 315, the elevator controller 310, and/or the like.

Still referring to FIG. 4B, it should be understood that the operating logic 420, display logic 432, the notification logic 434, the elevator cab request logic 436, the elevator cab confirmation logic 438, and the identification logic 440 may simultaneously operate, in real time, alone or with the access control device 315 and/or the elevator controller 310, to determine the identified user 130, the current floor 105 (i.e., call floor) of the identified user 130, prompt the user 130 for a destination floor, establish the destination floor, request the elevator cab 12, receive a confirmation of the elevator cab 12 request, and notify the identified user 130 of the assigned elevator cab without physical contact or a need to touch any user input by the identified user 130. That is, the illustrative touchless elevator cab request system 300 permits for touchless elevator cab requests, notification, and travel.

Figure 4C:
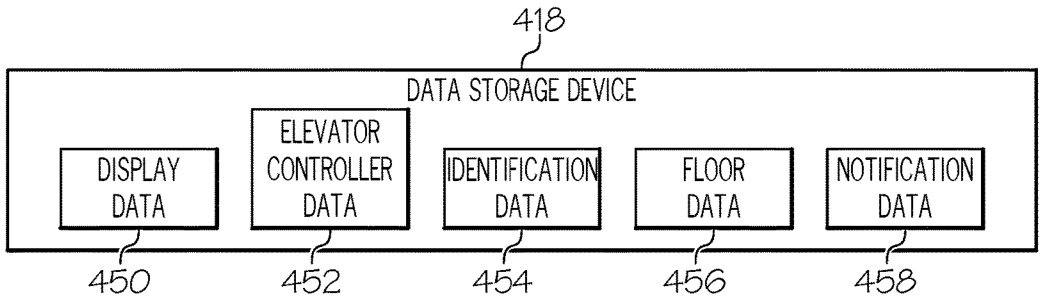
FIG. 4C schematically depicts an illustrative data storage device containing illustrative data components according to one or more embodiments shown and described herein.

FIG. 4C schematically depicts a block diagram of various data contained within a storage device (e.g., the data storage device 418). It should be understood that the data storage device 418 may reside local to and/or remote from the elevator cab request module 115 and may be configured to store one or more pieces of data for access by the elevator cab request module 115 and/or other components, such as the access control device 315 and/or the elevator controller 310.

As shown in FIG. 4C, the data storage device 418 may include, for example, display data 450, such as data related to the unique user information, the current floor 105 (i.e., call floor), the destination floor, the assigned elevator cab 12, and the like, that may be displayed by the graphical user interface 140 with visual queues or other distinguishing methods for informing the identified user 130 of the assigned elevator cab 12, destination floor requests, and/or the like. The data storage device 418 further includes the elevator controller data 452, such as data related to which elevator controller 310 to contact for different current floor 105 (i.e., call floor) and/or destination floors, data populated by the elevator controller 310 and/or the access control device 315 such as the assigned elevator cab 12, data related to the request for the elevator cab 12, and/or the like.

The data storage device 418 further includes the identification data 454. The identification data 454 may include data, either stored on the elevator cab request module 115 or retrieved from the access control device 315, and/or stored on and received from some other data repository that is remote from the elevator cab request module 115 and/or to the access control device 315, that is related to all users that have access to the specific elevator cabs 12 on the current floor 105 (i.e., call floor) and/or all users who have access to any elevator cab 12 on all floors. As such, the identification data 454 may be populated with specific user information from a remote database (e.g., the access control device 315) before or after identification of the identified user 130 via the plurality of data sources 135, by using data stored on the plurality of data sources 135 and transferring that data and other data (e.g., from the access control device 315) to the data storage device 418, and/or the like. In embodiments, some data may be remotely stored and is retrieved, as needed, to be stored as identification data 454 in the data storage device 418. For example, when the identified user 130 accesses the elevator cab request module 115 via the plurality of data sources 135 utilizing the unique identifier device 125, the elevator cab request module 115 may gather data about the identified user 130 from the access control device 315 and/or from the elevator controller 310, which is remote from the elevator cab request module 115 and that data may be retrieved and temporary or permanently stored as identification data 454 in the data storage device 418. As such, the subsequent use within a predetermined time frame (e.g., same day or same hour) may not result in a need to access the access control device 315. Further, batch downloads or other routinely performed data dumps may be completed for each user from the access control device 315 and/or the elevator controller 310 to the identification data 454. Conversely, data may be gathered routinely from the identification data 454 and provided to the access control device 315 and/or the elevator controller 310 (e.g., number of times a user uses the elevator cab request module 115, a time that the one of the plurality of data sources 135 was received by the unique identifier device 125, and/or the like).

The identification data 454 may further include data related to which destination floors that the identified user 130 has been granted access permissions and is therefore able to request that the elevator cab 12 travel to. For example, in a ten-floor building, a first user may have access only to floor 1 and floor 3, while a second user may have access to floor 1, floor 3, floor 6, and floors 9-10. The destination floor access may change based on the identified user 130 as identified.

Still referring to FIG. 4C, the data storage device 418 may further include the floor data 456. The floor data 456 may include data related to the current floor 105 (i.e., call floor) that the elevator cab request module 115 is positioned on, or, alternatively, when access to the elevator cab request module 115 is remote, the current floor 105 (i.e., call floor) of the identified user 130. The floor data 456 further includes data relating to the number of floors in the buildings, the actual requested destination floor chosen by the identified user 130, and the like. The notification data 458 may include data related to the building schematics and, in particular, data related to the elevator cabs 12 entry location (or landing) within the building in reference to the elevator cab request module 115. Such data is used to display the assigned elevator cab 12 to the identified user 130 using the graphical user interface 140 to display in a map format such that the identified user 130 may visually understand which elevator cab 12 to enter based on the current location of the identified user 130 and the elevator cab request module 115. Additional data may be stored that is related to the type of audio device, volume, pitch, and/or the like, and tactile device information of the notification device 120.

As mentioned above, the various components described with respect to FIGS. 4A-4C may be used to carry out one or more processes to improve touchless elevator cab requests by determining identity of the identified user 130, the current floor 105 (i.e. call floor) of the identified user 130, prompting the identified user 130 for a destination floor selection, establishing the destination floor, requesting the elevator cab 12, receiving a confirmation of the elevator cab 12 request, and notifying the identified user 130 of the assigned elevator cab 12 without physical contact by the identified user 130 with any user input, as discussed in greater detail herein.

Further, it should be understood that the components depicted in FIGS. 4A-4C are merely illustrative and are not intended to limit the scope of this disclosure. More specifically, while the components in FIGS. 4A-4C are illustrated as residing within the elevator cab request module 115, this is a non-limiting example. In some embodiments, one or more of the components may reside external to the elevator cab request module 115 (e.g., within the access control device 315 and/or elevator controller 310). Similarly, while FIGS. 4A-4C is directed to the elevator cab request module 115, other components, such as the administrator computing device 320, the access control device 315 and/or the elevator controller 310, as depicted in FIG. 3, may include similar hardware, software, and/or firmware and perform similar functionality as described with respect to FIGS. 4A-4C.

Figure 5:
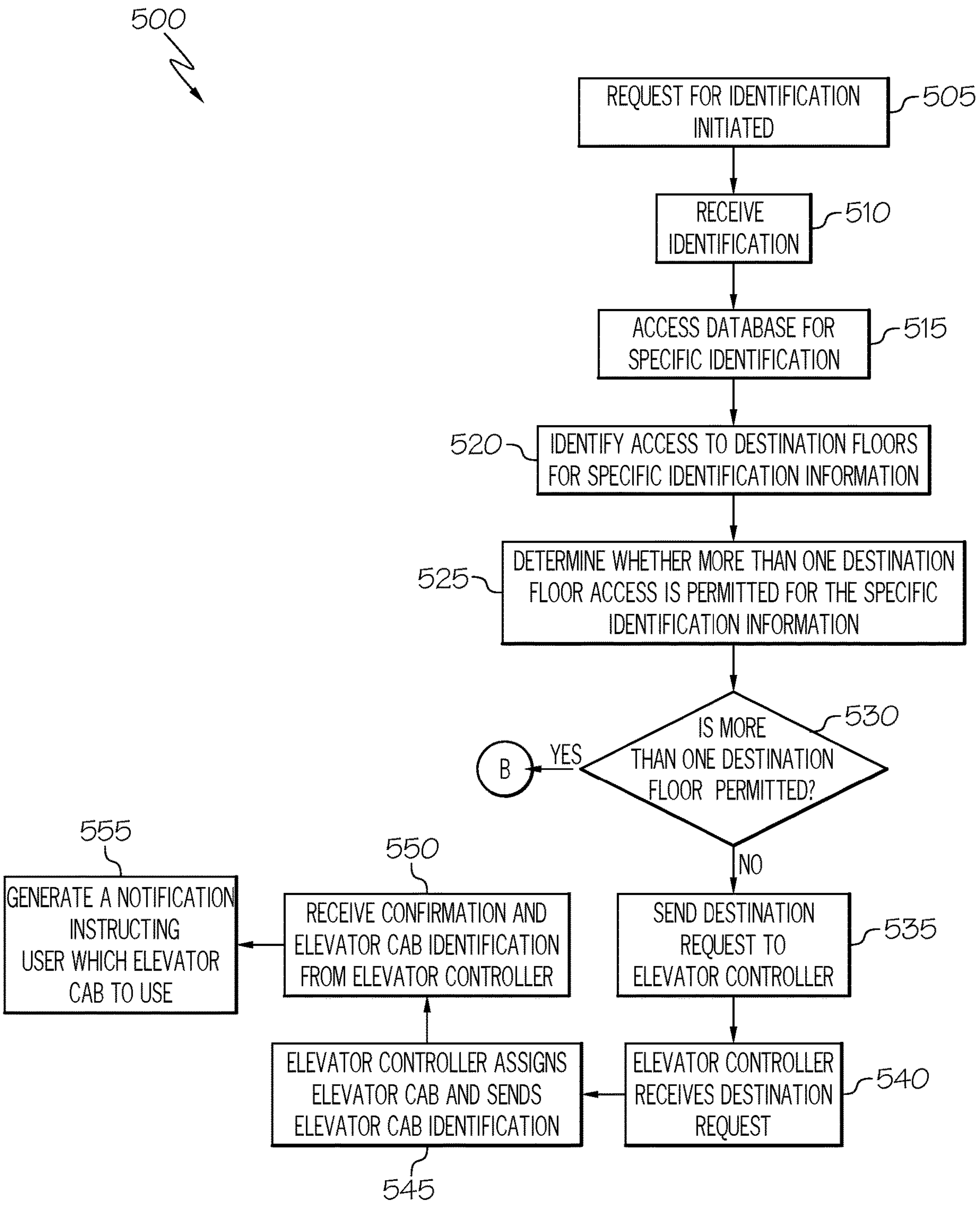
FIG. 5 depicts a flow diagram of an illustrative method for touchless request for an elevator cab with a single destination floor according to one or more embodiments shown and described herein.

Referring back to FIGS. 2-3 and 4A-4C and now referring to FIG. 5, a flow diagram that graphically depicts an illustrative method 500 for touchless request for the elevator cab 12 with a single unlocked destination floor for the identified user 130 is provided. Although the steps associated with the blocks of FIG. 5 will be described as being separate tasks, in other embodiments, the blocks may be combined or omitted. Further, while the steps associated with the blocks of FIG. 5 will be described as being performed in a particular order, in other embodiments, the steps may be performed in a different order.

At block 505, a request for an identification is initiated by the elevator cab request module 115. The request may be a prompt (e.g., a visual prompt, an audio prompt, combinations thereof, and/or the like) to the identified user 130 to swipe, scan, or otherwise transfer data from one of the plurality of data sources 135 to the elevator cab request module 115 via the unique identifier device 125. At block 510, the elevator cab request module 115 receives the unique identification from the user 130 and accesses the data storage device 418, the access control device 315, and/or combinations thereof, to locate a plurality of specific identification information and permissions associated with the received unique identification provided by the user 130 via one of the plurality of data sources 135, at block 515.

At block 520, the specific destination floors associated with the plurality of specific identification information and access permissions are determined for the now identified user 130 and, at block 525, a determination is made whether the identified user 130 has permission for access to more than one destination floor. If, at block 530, the identified user 130 is determined to have access to more than one destination floor, the illustrative method 500 will continue with the illustrative method 600 discussed in FIG. 6 herein starting at block 605. If, at block 530, the identified user 130 is determined to have access to only one destination floor, the destination floor request command is sent via the elevator cab request module 115 directly to the elevator controller 310 or through the access control device 315 to the elevator controller 310, at block 535. That is, in some embodiments, the access control device 315 and/or the elevator cab request module 115 may unlock the destination floor and provide a signal indicative of a request to move the elevator cab 12 to the current floor 105 (i.e., call floor) and the unlocked destination floor. As such, the destination floor request command includes a plurality of data including the current floor 105 (i.e. call floor) of the identified user 130, the destination floor of the identified user 130, and the like. In other embodiments, the elevator controller 310 may unlock the destination floor.

The elevator controller 310 receives the destination floor request command, at block 540, and determines the available elevator cabs 12 and assigns one of the available elevator cabs 12 to transport the identified user 130 between the current floor 105 (i.e., the call floor) and the destination floor while sending assigned elevator cab identification to the elevator cab request module 115 and/or to the access control device 315, at block 545. In other embodiments, the elevator controller 310 unlocks the destination floor, determines which elevator cabs 12 are available to service the call, and assigns one of the available elevator cabs 12 to transport the identified user 130 between the current floor 105 (i.e., the call floor) and the destination floor. Concurrently, the elevator controller 310 may also transmit the assigned elevator cab identification to the elevator cab request module 115 and/or to the access control device 315 regardless of which device may have make the initial request for the unlocking of the destination floor based on the destination floor permission of the identified user 130. Rather, instead of the elevator cab request module 115 and/or to the access control device 315 providing data or unlocking access to the destination floors based on the permissions for the identified user 130, the unique identifying information and/or the permissions data of the destination floor is sent to the elevator controller 310 and the elevator controller 310 unlocks the destination floor while assigning and conveying the assignment of the elevator cab 12.

In other embodiments, the elevator controller 310 receives data from the access control device 315 concerning access or permission for the identified user 130 (e.g., which floors the identified user 130 is permitted to access of the plurality of destination floors) and instructs the elevator cab request module 115 of the permitted destination floors of the plurality of destination floors and the elevator cab request module 115 unlocks the destination floor based on the user selection and informs the elevator controller 310 of the requested destination floor.

It should be appreciated that more than one elevator cab 12 may be available or that the system includes only one elevator cab 12. At block 550, the elevator cab request module 115 receives confirmation directly from the elevator controller 310 or from the access control device 315 of the assigned elevator cab 12. At block 555, the assignment of the elevator cab 12 is conveyed to the identified user 130 by a notification or alert via the notification device 120. For example, the notification may be an indicia displayed via the graphical user interface 140 on the notification device 120 of the elevator cab request module 115 such that the identified user 130 may have a visual indication of the assigned elevator cab 12. Example visual indications of the assigned elevator cab 12 may be a map view with the assigned elevator cab 12 highlighted or otherwise distinguished, a number of other corresponding identification to the elevator cab 12, and/or the like. Other example notifications or alerts may be an audible notification alerting the identified user 130 to the elevator cab 12 assigned such as an audible voice notifying the identified user 130 of the unique identification of the elevator cab 12, an audible alert of the name of the identified user 130 when the elevator cab 12 arrives at the current floor (i.e., call floor) landing that alerts the identified user 130 to enter that particular assigned elevator cab 12, and/or braille on the tactile device configured to notify the user of the assigned elevator cab 12.

Figure 6:
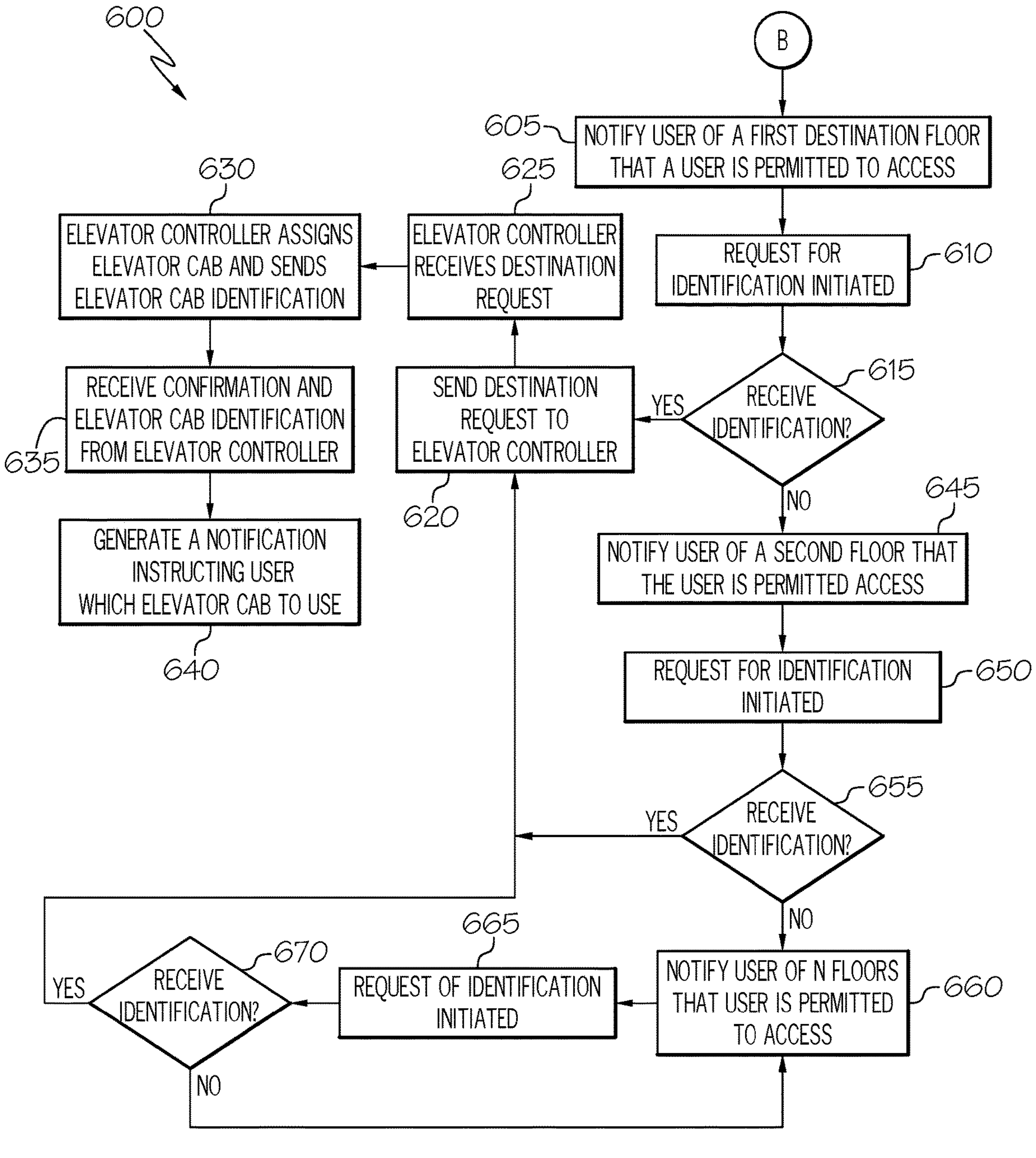
FIG. 6 depicts a flow diagram of an illustrative method for touchless request for an elevator cab with a plurality of destination floors according to one or more embodiments shown and described herein.

Referring still to FIGS. 2-3 and 4A-4C and now referring to FIG. 6, a flow diagram is provided that graphically depicts an illustrative method 600 for touchless request for the elevator cab in which the identified user 130 has access permissions to multiple destination floors. Although the steps associated with the blocks of FIG. 6 will be described as being separate tasks, in other embodiments, the blocks may be combined or omitted. Further, while the steps associated with the blocks of FIG. 6 will described as being performed in a particular order, in other embodiments, the steps may be performed in a different order. Further, it should be understood that the illustrative method 600 incorporates blocks 505-530 from the illustrative method 500 of FIG. 5 in which, at block 530, it is determined that the identified user 130 identified has access to more than one destination floor.

At block 605, a first destination floor that the identified user 130 has access, or is otherwise permitted to enter, is conveyed to the identified user 130 via the notification device 120 such as a display on the notification device 120, an audible output, or a tactile output to the identified user 130. In some embodiments, the first destination floor may be displayed, audibly output, or tacitly output in a numerical format such as the floor number, (e.g., "Floor 3"), visually in a map view of the graphical user interface 140 with the first floor highlighted or otherwise distinguished, and/or the like. Further, the first floor may be determined to be the closest floor to the current floor 105 (i.e., call floor) of the identified user 130, the furthest floor from the current floor 105 (i.e., call floor) of the identified user 130, the most frequently visited floor of the identified user 130, or some other order.

At block 610, a request for the identification is initiated by the elevator cab request module 115 during or immediately after notifying the identified user 130 of the first destination floor, at block 605. The request may be a prompt (e.g., a visual prompt, an audio prompt, tactile prompt, combinations thereof, and/or the like) to the identified user 130 to swipe, scan, or otherwise transfer data from one of the plurality of data sources 135 to the elevator cab request module 115 via the unique identifier device 125. That is, the elevator cab request module 115 is waiting for the identified user 130 to select a destination floor by providing one of the plurality of data sources 135 a second or subsequent time, which indicates a desire of the identified user 130 to travel to the first destination floor. Further, it should be appreciated that the one of the plurality of data sources 135 provided a second or subsequent time may be the same one of the plurality of data sources 135 used by the identified user 130 at block 510 (FIG. 5). However, this is non-limiting and a different one of the plurality of data sources 135 may be used.

At block 615, a determination is made as to whether the elevator cab request module 115 receives the one of the plurality of data sources 135 the second or subsequent time within a predetermined time limit from notifying the identified user 130 of the first destination floor and/or from the request for the identification initiated at blocks 605-610 respectively. If the unique identification is received from the identified user 130 a second time, at block 615, then, at block 620, the destination floor request command is sent to the elevator controller 310 via the elevator cab request module 115 directly to the elevator controller 310 or through the access control device 315 to the elevator controller 310. That is, in some embodiments, the access control device 315 and/or the elevator cab request module 115 may unlock the destination floor and provide a signal indicative of a request to move the elevator cab 12 to the current floor 105 (i.e., call floor) and the unlocked destination floor. As such, the destination floor request command includes a plurality of data including the current floor 105 (i.e. call floor) of the identified user 130, the destination floor of the identified user 130, and the like.

The elevator controller 310 receives the destination floor request command, at block 625, and determines the available elevator cabs 12 and assigns one of the available elevator cabs 12 to transport the identified user 130 between the current floor 105 a (i.e., call floor) nd the destination floor while sending assigned elevator cab identification to the elevator cab request module 115 and/or to the access control device 315, at block 630. At block 635, the elevator cab request module 115 receives confirmation directly from the elevator controller 310 or from the access control device 315 of the assigned elevator cab 12.

In other embodiments, the elevator controller 310 unlocks the destination floor, determines the available elevator cabs 12 and assigns one of the available elevator cabs 12 to transport the identified user 130 between the current floor 105 (i.e., call floor) and the destination floor while sending assigned elevator cab identification to the elevator cab request module 115 and/or to the access control device 315 independent from, or without receiving the destination floor request command form the elevator cab request module 115 and/or to the access control device 315. Rather, the unique identifying information and/or the permissions data of the destination floor is sent to the elevator controller 310 and the elevator controller 310 unlocks the destination floor while assigning and conveying the assignment of the elevator cab 12.

In other embodiments, the elevator controller 310 receives data from the access control device 315 concerning access or permission for the identified user 130 (e.g., which floors the identified user 130 is permitted to access of the plurality of destination floors) and instructs the elevator cab request module 115 of the permitted destination floors of the plurality of destination floors and the elevator cab request module 115 unlocks the destination floor based on the user selection and informs the elevator controller 310 of the requested destination floor.

At block 640, the assignment of the elevator cab 12 is conveyed to the identified user 130 by a notification or alert via the notification device 120. For example, the notification may be an indicia displayed via the graphical user interface 140 on the notification device 120 of the elevator cab request module 115 such that the identified user 130 may have a visual indication of the assigned elevator cab 12. Example visual indications of the assigned elevator cab 12 may be a map view with the assigned elevator cab 12 highlighted or otherwise distinguished, a number of other corresponding identification to the elevator cab 12, and/or the like. Other example notifications or alerts may be an audible notification alerting the identified user 130 to the elevator cab 12 assigned such as an audible voice notifying the identified user 130 of the unique identification of the elevator cab 12, an audible alert of the name of the identified user 130 when the elevator cab arrives at the current floor (i.e., call floor) landing that alerts the identified user 130 to enter that particular assigned elevator cab 12, and/or braille on the tactile device configured to notify the identified user 130 of the assigned elevator cab 12.

If, at block 615, the determination is made that the elevator cab request module 115 did not receive the unique identification from the identified user 130 the second time, then, at block 645, a second destination floor to which the identified user 130 has access, or is permitted to enter, is conveyed to the identified user 130 via the notification device 120 such as a display on the notification device 120, an audible output, or a tactile output to the identified user 130. In some embodiments, the first destination floor may be displayed, audibly output, or tacitly output. In some embodiments, the second destination floor may be displayed, audibly output, or tacitly output in a numerical format such as the floor number, (e.g., "Floor 3"), visually in a map view of the graphical user interface 140 with the second floor highlighted or otherwise distinguished, and/or the like. It should be understood that the second floor discussed herein is different from the first floor. Further, the second floor may be determined to be the second closest floor to the current floor 105 (i.e., call floor) of the identified user 130, the second furthest floor from the current floor 105 (i.e., call floor) of the identified user 130, the second most frequently visited floor of the identified user 130, or some other order.

At block 650, a request for an identification is initiated by the elevator cab request module 115 during or immediately after notifying the identified user 130 of the second destination floor, at block 645. The request may be a prompt (e.g., a visual prompt, an audio prompt, tactile prompt combinations thereof, and/or the like) to the identified user 130 to swipe, scan, or otherwise transfer data from one of the plurality of data sources 135 to the elevator cab request module 115 via the unique identifier device 125. That is, the elevator cab request module 115 is waiting for the identified user 130 to select a destination floor by providing one of the plurality of data sources 135 a second or subsequent time, which indicates a desire of the identified user 130 to travel to the second destination floor. Further, it should be appreciated that the one of the plurality of data sources 135 provided a second or subsequent time may be the same one of the plurality of data sources 135 used by the identified user 130 at block 510 (FIG. 5). However, this is non-limiting and a different one of the plurality of data sources 135 may be used.

At block 655, a determination is made as to whether the elevator cab request module 115 receives the one of the plurality of data sources 135 the second or subsequent time within a predetermined time limit from notifying the identified user 130 of the second destination floor and/or from the request for the identification initiated at blocks 645-650 respectively. If the unique identification is received a second time from the identified user 130, at block 655, then at block 620, the destination floor request command is sent to the elevator controller 310 via the elevator cab request module 115 directly to the elevator controller 310 or through the access control device 315 to the elevator controller 310. That is, in some embodiments, the access control device 315 and/or the elevator cab request module 115 may unlock the destination floor and provide a signal indicative of a request to move the elevator cab 12 to the current floor 105 (i.e., call floor) and the unlocked destination floor. As such, the destination floor request command includes a plurality of data including the current floor 105 (i.e., call floor) of the identified user 130, the destination floor of the identified user 130, and the like.

The elevator controller 310 receives the destination floor request command, at block 625, and determines the available elevator cabs 12 and assigns one of the available elevator cabs 12 to transport the identified user 130 between the current floor 105 (i.e., call floor) and the destination floor while sending assigned elevator cab identification to the elevator cab request module 115 and/or to the access control device 315, at block 630. At block 635, the elevator cab request module 115 receives confirmation directly from the elevator controller 310 or from the access control device 315 of the assigned elevator cab 12.

In other embodiments, the elevator controller 310 unlocks the destination floor, determines the available elevator cabs 12 and assigns one of the available elevator cabs 12 to transport the identified user 130 between the current floor 105 (i.e., call floor) and the destination floor while sending assigned elevator cab identification to the elevator cab request module 115 and/or to the access control device 315 independent from, or without receiving the destination floor request command form the elevator cab request module 115 and/or to the access control device 315. Rather, the unique identifying information and/or the permissions data of the destination floor is sent to the elevator controller 310 and the elevator controller 310 unlocks the destination floor while assigning and conveying the assignment of the elevator cab 12.

In other embodiments, the elevator controller 310 receives data from the access control device 315 concerning access or permission for the identified user 130 (e.g., which floors the identified user 130 is permitted to access of the plurality of destination floors) and instructs the elevator cab request module 115 of the permitted destination floors of the plurality of destination floors and the elevator cab request module 115 unlocks the destination floor based on the user selection and informs the elevator controller 310 of the requested destination floor.

At block 640, the assignment of the elevator cab 12 is conveyed to the identified user 130 by a notification or alert via the notification device 120. For example, the notification may be an indicia displayed via the graphical user interface 140 on the notification device 120 of the elevator cab request module 115 such that the identified user 130 may have a visual indication of the assigned elevator cab 12. Example visual indications of the assigned elevator cab 12 may be a map view with the assigned elevator cab 12 highlighted or otherwise distinguished, a number of other corresponding identification to the elevator cab 12, and/or the like. Other example notifications or alerts may be an audible notification alerting the identified user 130 to the elevator cab 12 assigned such as an audible voice notifying the identified user 130 of the unique identification of the elevator cab 12, an audible alert of the name of the identified user 130 when the elevator cab arrives at the current floor (i.e., call floor) landing that alerts the identified user 130 to enter that particular assigned elevator cab 12, and/or braille on the tactile device configured to notify the identified user 130 of the assigned elevator cab 12. It should be appreciated that if the identified user 130 only has access to the first and second destination floors, then optionally, blocks 605-615 and 645-655 are looped or repeated until a destination floor is chosen between the two destination floors.

If, at block 655, the determination is made that the elevator cab request module 115 did not receive the unique identification from the identified user 130 the second time, then, at block 660, an "N" destination floor to which the identified user 130 has access is conveyed to the identified user 130 via the notification device 120 such as a display on the notification device 120, an audible output, or a tactile output to the identified user 130. In some embodiments, the "N" destination floor may be displayed, audibly output, or tacitly output in a numerical format such as the floor number, (e.g., "Floor N"), visually in a map view with the "N" floor highlighted or otherwise distinguished, and/or the like. Further, the "N" floor may be determined to be the "N" closest floor to the current floor of the user, the "N" furthest floor from the current floor of the identified user 130, the "N" most frequently visited floor of the identified user 130, or some other order.

At block 665, a request for an identification for a second or subsequent swipe of one of the plurality of data sources 135 is initiated by the elevator cab request module 115 during or immediately after notifying the identified user 130 of the "N" destination floor, at block 660. The request may be a prompt (e.g., a visual prompt, an audio prompt, a tactile prompt, combinations thereof, and/or the like) to the identified user 130 to swipe, scan, or otherwise transfer data from one of the plurality of data sources 135 to the elevator cab request module 115 via the unique identifier device 125. That is, the elevator cab request module 115 is waiting for the identified user 130 to select a destination floor by providing one of the plurality of data sources 135 a second or subsequent time, which indicates a desire of the identified user 130 to travel to the "N" destination floor. Further, it should be appreciated that the one of the plurality of data sources 135 provided a second or subsequent time may be the same one of the plurality of data sources 135 used by the identified user 130 at block 510 (FIG. 5). However, this is non-limiting and a different one of the plurality of data sources 135 may be used.

At block 670, a determination is made as to whether the elevator cab request module 115 receives the one of the plurality of data sources 135 the second or subsequent time within a predetermined time limit from notifying the identified user 130 of the "N" destination floor and/or from the request for the identification initiated at blocks 660-665 respectively. If the unique identification is received from the identified user 130, at block 670, then at block 620, the "N" destination floor request command is sent to the elevator controller 310 via the elevator cab request module 115 directly to the elevator controller 310 or through the access control device 315 to the elevator controller 310. That is, in some embodiments, the access control device 315 and/or the elevator cab request module 115 may unlock the "N" destination floor and provide a signal indicative of a request to move the elevator cab 12 to the current floor 105 (i.e., call floor) and the unlocked destination floor. As such, the "N" destination floor request command includes a plurality of data including the current floor 105 (i.e., call floor) of the identified user 130, the "N" destination floor of the identified user 130, and the like.

When the unique identification is received the second time from the identified user 130, at block 670, then at block 620, the destination floor request command is sent to the elevator controller 310 via the elevator cab request module 115 directly to the elevator controller 310 or through the access control device 315 to the elevator controller 310. That is, the access control device 315 and/or the elevator cab request module 115 may unlock the destination floor and provide a signal indicative of a request to move the elevator cab 12 to the current floor 105 (i.e., call floor) and the unlocked destination floor. As such, the destination floor request command includes a plurality of data including the current floor 105 (i.e., call floor) of the identified user 130, the destination floor of the user 130, and the like.

The elevator controller 310 receives the destination floor request command, at block 625, and determines the available elevator cabs 12 and assigns one of the available elevator cabs 12 to transport the identified user 130 between the current floor 105 (i.e., call floor) and the destination floor while sending assigned elevator cab identification to the elevator cab request module 115 and/or to the access control device 315, at block 630. At block 635, the elevator cab request module 115 receives confirmation directly from the elevator controller 310 or from the access control device 315 of the assigned elevator cab 12.

In other embodiments, the elevator controller 310 unlocks the destination floor, determines the available elevator cabs 12 and assigns one of the available elevator cabs 12 to transport the identified user 130 between the current floor 105 (i.e., call floor) and the destination floor while sending assigned elevator cab identification to the elevator cab request module 115 and/or to the access control device 315 independent from, or without receiving the destination floor request command form the elevator cab request module 115 and/or to the access control device 315. Rather, the unique identifying information and/or the permissions data of the destination floor is sent to the elevator controller 310 and the elevator controller 310 unlocks the destination floor while assigning and conveying the assignment of the elevator cab 12.

At block 640, the assignment of the elevator cab 12 is conveyed to the identified user 130 by a notification or alert via the notification device 120. For example, the notification may be an indicia displayed via the graphical user interface 140 on the notification device 120 of the elevator cab request module 115 such that the identified user 130 may have a visual indication of the assigned elevator cab 12. Example visual indications of the assigned elevator cab 12 may be a map view with the assigned elevator cab 12 highlighted or otherwise distinguished, a number of other corresponding identification to the elevator cab 12, and/or the like. Other example notifications or alerts may be an audible notification alerting the identified user 130 to the elevator cab 12 assigned such as an audible voice notifying the identified user 130 of the unique identification of the elevator cab 12, an audible alert of the name of the identified user 130 when the elevator cab arrives at the landing (e.g., current floor and/or call floor) that alerts the identified user 130 to enter that particular assigned elevator cab 12, and/or braille on the tactile device configured to notify the identified user 130 of the assigned elevator cab 12. It should be appreciated that if the identified user 130 only has access to the first and second destination floors, then optionally, blocks 605-615 and 645-655 are looped or repeated until a destination floor is chosen between the two destination floors.

If, at block 670, the determination is made that the elevator cab request module 115 did not receive the unique identification from the identified user 130 the second time, then the illustrative method 600 returns to block 660 where a next or different "N" destination floor that the identified user 130 has access is conveyed to the identified user 130 via the notification device 120. It should be understood that blocks 660-670 loop through all the "N" destination floors that the identified user 130 has access or are unlocked for the identified user 130 (which may include the first and second destination floors) and only ends when the determination is made that the elevator cab request module 115 receives the one of the plurality of data sources 135 provided a second or subsequent time from the identified user 130, at block 670. Further, it should be understood that "N" may be all the available or permitted destination floors that the identified user 130 has access.

It should now be understood that the embodiments described herein are directed to improved systems and methods for a touchless request and enter elevator cabs that travel between a current floor and a destination floor of the user. Further, graphical user interfaces and touchless user inputs are used to determine the desired destination floor and to notify or alert the user to which elevator cab to enter once assigned by an elevator controller to travel between the current floor and the destination floor of the user.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for a touchless request for an elevator cab, the system comprising:

an elevator controller;

an elevator cab request module having:

a processor positioned to be remote from the elevator controller and communicatively coupled to the elevator controller;

a display device communicatively coupled to the processor; and a non-transitory, processor-readable data storage device in communication with the processor, the non-transitory, processor-readable data storage device comprising one or more programming instructions that, when executed, cause the processor to:

process a unique identification received from a user;

determine a current floor for which the unique identification was provided;

determine a destination floor access permission from a plurality of destination floors based on the unique identification;

determine a landing to travel to based on the destination floor access permission of the plurality of destination floors;

send an elevator cab request command to the elevator controller to request the elevator cab to the current floor and then to travel to the landing; and generate a notification for the elevator cab that is assigned to travel between the current floor and the landing by the elevator controller, wherein the notification is displayed on the display device.

2. The system of claim 1, wherein the data storage device stores a plurality of unique identifications corresponding to each access permission of each of the plurality of destination floors.

3. The system of claim 1, wherein:

the elevator controller assigns the elevator cab to move between the current floor and the landing, and the elevator controller transmits data to the non-transitory, processor-readable data storage device in communication with the processor indicative of the assigned elevator cab.

4. The system of claim 1, wherein the notification displayed on the display device is a map view to visually distinguish the assigned elevator cab from a plurality of elevator cabs.

5. The system of claim 1, wherein the notification for the assigned elevator cab is also an audible alert indicating the assigned elevator cab.

6. The system of claim 1, wherein the notification for the assigned elevator cab is also a tactile alert indicating the assigned elevator cab.

7. The system of claim 1, wherein the unique identification is selected from at least one of a radio frequency identification, a barcode, a quick response code, a facial recognition, a voice recognition, a password, a passcode, and a mobile communication application of a personal mobile electronic device.

8. A method for a touchless request for an elevator cab, the method comprising:

receiving, by an elevator cab request module having a processor and a notification device and is positioned to be remote from the elevator controller, a unique identification from a user;

determining, by the elevator cab request module, a current floor of the user based on a floor on which the unique identification was provided;

accessing, by the elevator cab request module, a data storage device to determine at least one destination floor access permission based on the unique identification;

determining, by the elevator cab request module, a landing to travel to based on the at least one destination floor access permission;

sending, by the elevator cab request module, an elevator cab request command to an elevator controller to request the elevator cab to the current floor and to travel to the landing of a destination floor;

acknowledging, by the elevator controller, the elevator cab request command and assigning the elevator cab;

sending, by the elevator controller, an assigned elevator cab data that corresponds to the assigned elevator cab to the elevator cab request module; and generating, by the notification device, a notification displayed for the assigned elevator cab that is assigned to travel between the current floor and the landing by the elevator controller.

9. The method of claim 8, wherein the data storage device stores a plurality of unique identifications, each corresponding with the at least one destination floor access permission.

10. The method of claim 8, wherein the displaying of the notification of the assigned elevator cab is in a map view visually distinguishing the assigned elevator cab from a plurality of elevator cabs.

11. The method of claim 8, wherein the notification device additionally notifies the user of the assigned elevator cab via an audible alert indicating the assigned elevator cab or the notification device is a tactile device for notifying the user of the assigned elevator cab via a tactile output.

12. The method of claim 8, wherein the unique identification is selected from at least one of a radio frequency identification, a barcode, a quick response code, a facial recognition, a voice recognition, a password, a passcode, and a mobile communication application of a personal mobile electronic device.

13. An elevator system for a touchless request for an elevator cab, the elevator system further including an elevator cab request module and an elevator controller, the elevator system comprising:

the elevator cab request module including:

a processor communicatively coupled to the elevator controller;

a notification device communicatively coupled to the processor;

a unique identifier device communicatively coupled to the processor; and a data storage device in communication with the processor and having one or more programming instructions that, when executed, cause the processor to:

process a unique identification received from a user via the unique identifier device;

determine a current floor of the user based on a floor on which the unique identification was provided;

access the data storage device to determine a plurality of destination floor access permissions assigned to the unique identification;

notify on the notification device a first destination floor choice of the plurality of destination floor access permissions assigned to the unique identification;

determine whether the unique identification was received from the user via the unique identifier device a second time indicating the selection of the first destination floor choice;

when determined that the unique identification was not received from the user via the unique identifier device the second time, notify on the notification device a second destination floor choice of the plurality of destination floor access permissions assigned to the unique identification;

determine whether the unique identification was received from the user via the unique identifier device the second time indicating the selection of the second destination floor choice;

when determined that the unique identification was not received from the user via the unique identifier device the second time, notify on the notification device an "N" destination floor choice of the plurality of destination floor access permissions assigned to the unique identification;

determine whether the unique identification was received from the user via the unique identifier device the second time indicating the selection of the "N" destination floor choice;

when determined that the unique identification was received from the user via the unique identifier device the second time indicating the selection of a destination floor selection from the plurality of destination floor access permissions, send a cab request command to the elevator controller to request the elevator cab to the current floor and to travel to the destination floor selection; and generate a notification for the elevator cab that is assigned by the elevator controller to travel between the current floor and the destination floor selection.

14. The elevator system of claim 13, wherein the data storage device stores a plurality of unique identifications that correspond to the plurality of destination floor access permissions.

15. The elevator system of claim 14, wherein the data storage device is positioned within the elevator cab request module.

16. The elevator system of claim 14, further comprising:

an access control device communicatively coupled to the processor, the access control device further comprises the data storage device.

17. The elevator system of claim 13, wherein the elevator controller assigns the elevator cab to move between the current floor and the destination floor selection.

18. The elevator system of claim 13, wherein the elevator controller transmits data to the processor indicative of the assigned elevator cab.

19. The elevator system of claim 13, wherein the notification for the elevator cab is selected from one of a visual notification, an audible notification, and a tactile notification.

* * * * *